March 31, 1970  WOO F. CHOW  3,504,358
SENSING DEVICE

Filed Aug. 30, 1965  2 Sheets-Sheet 1

INVENTOR
WOO F. CHOW

BY Rene A. Kuypers

ATTORNEY

March 31, 1970  WOO F. CHOW  3,504,358
SENSING DEVICE

Filed Aug. 30, 1965  2 Sheets-Sheet 2

REFERENCE

United States Patent Office 3,504,358
Patented Mar. 31, 1970

3,504,358
SENSING DEVICE
Woo F. Chow, Horsham, Pa., assignor to Sperry Rand Corporation, New York, N.Y., a corporation of Delaware
Filed Aug. 30, 1965, Ser. No. 483,662
Int. Cl. G11c *11/04, 11/14*
U.S. Cl. 340—174                                    9 Claims

ABSTRACT OF THE DISCLOSURE

The invention is related to a memory sensing device which produces a differential output signal. A double U-shaped sensor is utilized which is coupled to detect the information simultaneously at two coded memory locations. Binary information is distinguished by the amplitude of the signals across the outside legs of the U-shaped sensor.

This invention relates in general to a memory sensing device. In particular this invention relates to a sensing device for use with a thin film memory element.

In certain digital computer memory applications, it is required that two memory locations magnetized according to the code of binary datum "0," "1" or "1," "0" be utilized to represent a single bit of information (i.e., a "0" or "1"). By way of example, two memory locations are often used to represent a single bit of information in an associative memory. The read-out or sensing apparatus in the above described arrangement must be capable of interpreting the two memory locations so as to provide a single bit of information.

Accordingly, it is an object of this invention to provide a new and improved memory sensing device.

It is further an object of this invention to provide a new and improved thin film sensing device.

It is still another object of this invention to provide a new and improved sensing device to read two memory locations simultaneously.

It is yet another object of this invention to provide a sensing device that provides a differential output signal.

It is a feature of this invention to provide a sensing device which can simultaneously read two memory locations along a plated wire storage element incorporating a uniaxial anisotropy (i.e., an induced easy axis of magnetization) so as to provide a differential output signal. In other words, the sensing device of this invention is such that it produces an output signal which is twice the amplitude of the signal which is being sensed in one of the memory locations. This is accomplished by providing two memory locations which are magnetized oppositely (i.e., as a "0" or as a "1" and alternatively, as a "1" and as a "0"). The sensing device has a double drive strap arrangement so that one strap is juxtaposed at the first memory location along the upper surface of a plated wire and the second strap is juxtaposed at the second memory location along the upper surface of the same plated wire. The double strap sensing device is further arranged so that each of the two straps is brought around under the plated wire and then common connected to one another.

A D.C. or a quasi D.C. (i.e., using the flat portion of a pulse) bias potential is then applied to each of the unconnected straps with respect to the common connection so as to rotate the magnetization vectors at the two memory locations along the plated wire to an angle removed from the easy axis of magnetization. A sine wave of known phase angle or a one cycle approximate sine wave of known phase angle is then applied to the plated wire. This causes the magnetization vectors at the two memory locations to oscillate about the quiescent point provided by the bias potential. Voltages are thereby induced in the respective straps of the sensing device with respect to ground which are opposite in polarity. The total induced output signal across the two straps is double the voltage induced in a single strap. The phase of the total induced output signal is determined by whether the bit coding at the two memory locations is "0," "1" or "1," "0." This output signal is changed from a phase relationship to an amplitude relationship. One of the output signals when changed from a phase relationship to an amplitude relationship will be of a polarity that will set a flip-flop, and the other will not. Hence, a "zero" or a "one" bit of information is readily distinguished from one another.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanied drawings, wherein:

Figure 3:
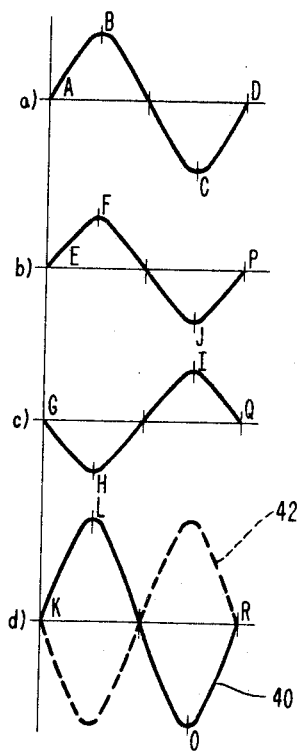
Figure 4:
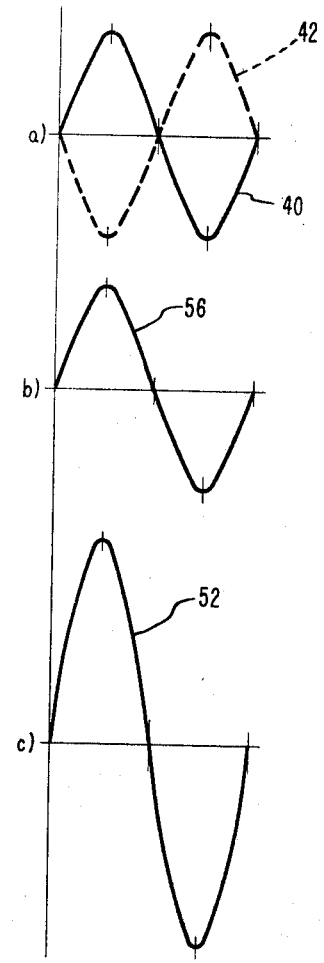

FIGURE 3 indicates the various waveforms of the induced signals present in the operation of the sensing device of the instant invention;

FIGURE 4 shows the various output signals produced by the sensing device and associated circuitry of the instant invention.

Figure 1:
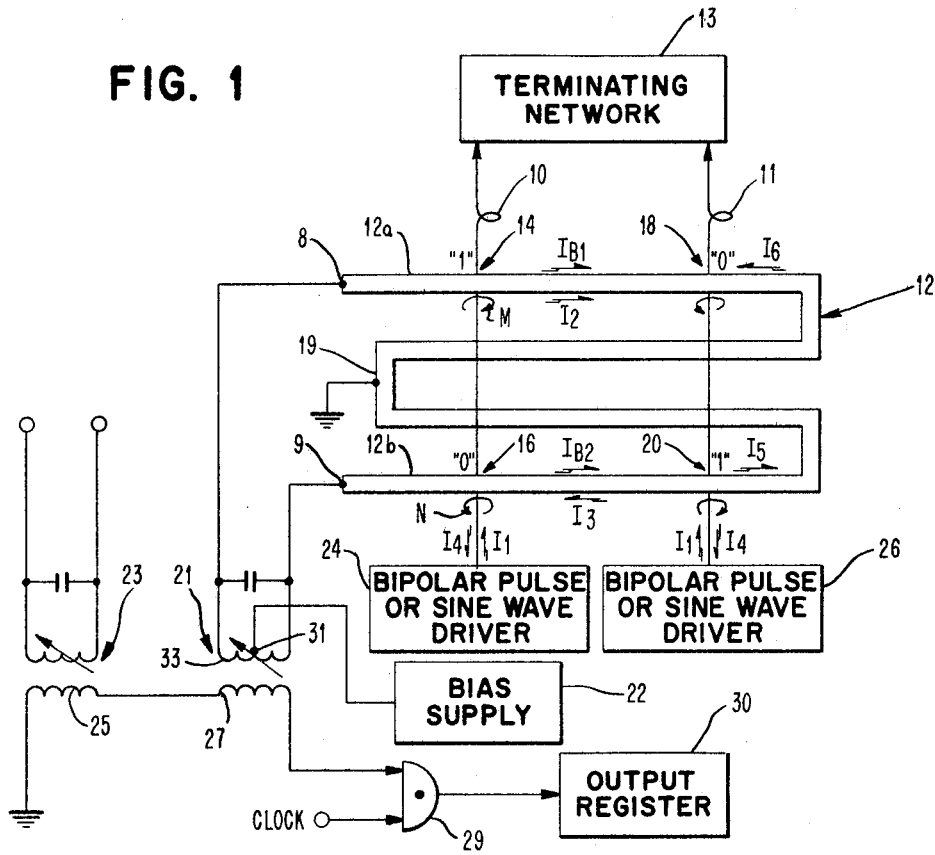
FIGURE 1 depicts the double strap sensing device of the instant invention.

Referring now to the drawings and in particular to FIG. 1 the dual sensing strap 12 is shown with respect to plated wire storage elements 10 and 11. The vertically arranged plated wires 10 and 11 are small diameter copper beryllium wire substrates approximately five mils in diameter. A thin magnetic film is electroplated on the wire surface with approximately a 10,000 Angstrom thickness of Permalloy (80% nickel–20% iron). The Permalloy coating is electroplated in the presence of a circumferential magnetic field that establishes a uniaxial anisotropy axis at right angles (i.e., around the circumference) to the length of the wire. The uniaxial anisotropy establishes an easy and hard direction of magnetization and the magnetization vectors of the thin film are normally oriented in a first or second equilibrium position along the easy axis, thereby establishing two bi-stable states necessary for binary logic applications. One end of the plated wires 10 and 11 are connected to a terminating network 13. The terminating network 13 is conventionally a ground bus, or an impedance which matches the impedance of the plated wire. The other end of the plated wires 10 and 11 are connected to respective sine wave driver circuits 24 and 26, respectively.

Positioned substantially orthogonal to the plated wires 10 and 11 is the double strap sensing device 12. The sensing device 12 consists of two straps 12a and 12b which are positioned in juxtaposition to the upper surface of the plated wires 10 and 11. The straps 12a and 12b are formed so that they are respectively brought in juxtaposition to the under side of the plated wires 10 and 11 and then physically joined together to form a common connection 19. The drive straps 12a and 12b and their respective return lines to ground are in actual practice position over and under one another and are depicted in the manner of FIGURE 1 for ease of understanding. The intersection of the plated wires 10 and 11 with the individual straps 12a and 12b of the sensing device 12 form the memory locations 14 and 16 along the plated wire 10 as well as the memory locations 18 and 20 along the plated wire 11. The memory locations 14 and 16 as well as location 18 and 20 are magnetized oppositely from one another. Thus, location 14 is magnetized, by way of example, as a binary "1" (clockwise orientation around the easy axis as viewed from the bottom end of the wire) and the memory location 16 as a binary "0" (counterclockwise orientation around the easy axis). Similarly, the location 18 is magnetized as a binary "0" and the location 20 as a binary "1." This particular coding arrangement or binary datum distinguishes an information "one" from an information "zero" when utilized as a digit of a memory word. The binary coding of the memory locations 14 and 16 will be arbitrarily considered as a "one" information digit whereas the locations 18 and 20 will be considered as a "zero" information digit. In order to clarify the description of the invention in the following paragraphs, the binary information located at a particular memory location will be referred to as a "1" or "0," whereas the coded digit will be referred to as a "one" or a "zero."

Connected across the two output terminals 8 and 9 of the sense device 12 is an amplifying and phase comparison device such as the sense parametron 21. A D.C. bias potential 22 is connected between the center tap 31 of the inductance coil 33 of the sense parametron as well as to the common connection 19. A phase reference signal such as the one supplied by a parametron 23 is also utilized in conjunction with the sense parametron 21 for reasons that will be discussed hereinafter. The coils 25 and 27, which are series connected, are inductively coupled to the respective output signals provided by the reference and the sense parametrons. The output signal of the series connected coils 25 and 27 is directed into one of the inputs of the AND gate 29. The second input of the AND gate is a conventional clock pulse. The output of the AND gate 29 is directed into the input terminal of a flip-flop device 30.

Figure 2:
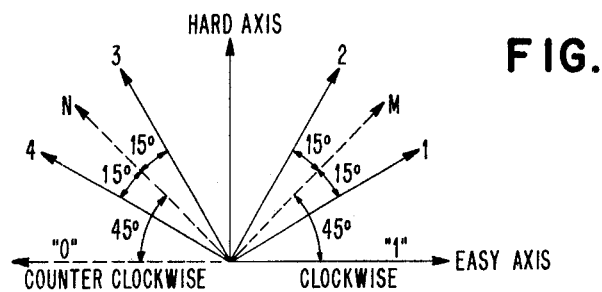
FIGURE 2 shows the vector orientation when a D.C. or a quasi D.C. bias potential is applied as well as the vector orientation when a sine wave is applied to the plated wire.

In operation, a bias current IB1 and IB2 is made to flow in the straps 12a and 12b. The positive terminal of the bias 22 is applied to the center tap 31 of the parametron tank coil 33. Current therefore flows from the respective terminals 8 and 9 to the ground terminal 19. These bias currents cause the magnetization vectors located at the intersections 14, 16, 18 and 20 to be rotated to an angle removed from the easy direction of magnetization. As an example, the rotation of the magnetization vectors at the memory locations may be approximately 45° as seen in FIGURE 2. In FIGURE 2, the vector at memory location 14 is represented by the vector M and the magnetization vector located at the memory location 16 is represented by the vector N. The plated wire 10 and 11 are considered as a word lines since many digits of information may be located along their length.

In order to read-out either a "zero" or a "one" digit the plated wire word line is energized by a sine wave or a one-cycle bi-polar pulse which has a known phase angle. The sine wave may be generated, for example, by a parametron device. By way of review, a parametron is a tank circuit comprising a non-linear capacitance or a non-linear inductance. If the capacitance or the inductance is made to vary periodically energy can be added to the tank circuit and amplification at a given phase angle relationship can be obtained. This may be shown more precisely by reference to the following formula, $$W = \frac{N^2}{2} \frac{\phi^2}{L}$$

where:
W=the energy stored in the inductor for a certain current
N=the number of turns in the inductor
$\phi$=the flux associated with the inductor
L=the inductance of the coil Since the flux cannot be changed instantaneously, if L is abruptly decreased when $\phi$ has some finite value, the energy in the inductor will be increased. Hence, if the inductance is decreased and increased at proper times, energy build-up in the tank will occur. The input current which is to be amplified and which flows into the tank circuit initially is called the seed current. The inductance is normally pumped (i.e., made to vary) at a frequency 2f and with a certain phase relationship with respect to the seed current in the inductor.

The following description will relate to the reading out of the "one" digit located along the plated wire 10. The description will apply equally well to the reading out of "zero" digit along the plated wire 11. The sine wave or a single cycle bi-polar pulse of known phase angle applied to the plated wire 10 by the sine wave or the bi-polar pulse driver 24 will cause the partially rotated magnetization vectors at the memory locations 14 and 16 to oscillate about the quiescent point such as, for example a 45° angle position (see FIG. 2). Assume that the sine wave or the bi-polar pulse applied by the driver 24 has a phase angle such that the first portion of the wave is positive going (A–B in FIGURE 3a). The positive portion of the pulse current waveform will cause the current I1 to flow in an upward direction towards the terminating network 13 or ground. This current will produce a magnetizing force which will cause the magnetization vector at location 14 (vector M in FIG. 2) to be rotated back to the easy axis of magnetization (i.e., the position of vector 1 in FIG. 2) and will cause the magnetization vector at location 16 (vector N in FIG. 2) to be rotated in a direction further removed from the easy axis of magnetization (i.e., the position of vector 3 in FIG. 2). These rotations away from the quiescent positions of vector M and N are, such as, for example approximately 15°.

The vector rotation from the position M to the position 1 as well as the vector rotation from the position N to the position 3 induces respective voltages in the straps 12a and 12b. The polarity of these voltages is determined as follows. Referring briefly to the memory location 14, when the vector M assumes the position of vector 1, there is a reduction of flux in the vertical component. This may be readily appreciated by referring to FIGURE 2. Since there is a reduction of flux in the vertical direction, the induced voltage produces the current I2 which flows so as to counteract this reduction of flux. Therefore, the terminal 8 of sensing device 12 is negative going with respect to the ground terminal (the connection between strap 12a and 12b). Terminal 8 is negative since the induced voltage acts as a battery and current flows from the positive to the negative terminals. This portion of induced signal is shown as G–H in FIGURE 3(c). Similarly, when the vector N at memory location 16 is rotated to the position represented by vector 3 there is an increase of flux in the vertical direction as readily seen by referring to FIG. 2. The current I3 is induced in the strap 12b so as to counteract this increase or provide a decrease of flux in the vertical direction. Hence, the terminal 9 is positive going with respect to the ground terminal. This portion of the induced signal is designated by E–F in FIGURE 3(b). However, since the terminal 8 is negative going with respect to ground and the terminal 9 is positive going with respect to ground, the differential voltage across the terminals 8 and 9 is twice the amplitude of E–F (FIG. 3b). This portion of the signal across terminals 9 and 8 is shown as K–L in FIG. 3(d).

During the negative going portion B–C of the sine wave (FIG. 3a) by the driver 24 the current I4 flows in the plated wire 10 and the vector M at memory location 14 is rotated from the position occupied by vector 1 to that of vector 2. In other words, there is an increase of flux in the vertical direction. Hence, a voltage is induced in the strap 12a of the sensing device 12 which opposes the increase of flux in the vertical direction. The current I6 produced by this induced voltage will oppose this increase in the flux. This current will cause the terminal 8 to go positive with respect to ground. This is shown by H–I in FIGURE 3(c). In like manner, there is a decrease in flux in the vertical direction when the vector N at memory location 16 is rotated from vector 3 to the position represented by the vector 4. To counteract this reduction of flux, the current I5 is induced in the strap 12b. Hence, the terminal 9 is negative going with respect to the ground terminal. This is shown by F–J in FIG. 3(b). Since the terminal 9 is negative going with respect to ground and the terminal 8 is positive going with respect to ground, the differential voltage across terminals 8 and 9 is shown as L–O in FIGURE 3(d).

When the sine wave applied to the plated wire 10 again is positive going (C–D in FIG. 3a) and the current I1 again flows, the vector M at the position of vector 2 returns to its original quiescent condition. Hence, there is a decrease of flux in the vertical direction. This will again cause the current I2 to be induced in the drive strap 12a to counteract this reduction of flux. Terminal 8 is therefore negative going (I–Q in FIG. 3c) with respect to ground.

The vector N will be rotated from the vector position 4 back to its quiescent position by the voltage swing CD of the applied sine wave, and this will cause an increase of flux in the vertical direction. This will cause the current I3 to be induced in the drive strap 12b so that the terminal 9 is positive going (J–P in FIG. 3b).

The differential output signal of this portion of the induced signal is designated as O–R in FIGURE 3(d). The total differential output signal 40 therefore appears across terminals 9 and 8 of the sense line 12 when the plated wire 10 is energized by the driver 24.

The sine wave or the bi-polar pulse emanating from the driver 26 and applied to the plated wire 11 has the same phase angle as the signal generated by the driver 24. This current when applied to the plated wire 11 will cause the signal 42 (FIG. 3d) to be induced across the terminals 9 and 8. It can therefore be readily seen that a "one" or a "zero" information bit is distinguished by the 0 or $\pi$ phase signal induced across terminals 9 or 8.

The output voltage induced across terminals 9 and 8 is large enough to seed the sense parametron 21. As discussed above, the seed current is the increment of energy which is first added to the parametron tank circuit so that it begins to oscillate. The inductance is then pumped or varied in synchronism with the tank oscillations in order to amplify the seed current.

The reference parametron 23 is similar in operation to the above-described sense parametron. It is always seeded by the same sine wave 56 (FIG. 4b). The coils 25 and 27 are series connected and respectively couple to the output signal produced by the parametrons 23 and 21.

The "zero" and "one" information bit, which is distinguished by a phase relationship is changed to an amplitude relationship. This is accomplished in the following manner. If the input signal 40 (FIG. 4a) seeds the sense parametron 21, the output signal 52 (FIG. 4c) is coupled across the coils 25 and 27. The signal 52 results from the fact that a portion of signal 40 which is amplified by the sense parametron 21 is coupled into coil 27. Similarly, a portion of the signal 56 is coupled into the coil 25. The coils being in additive phase produce the output signal 52.

The signal 52 is one of the two inputs to the AND gate 29. The other input to the AND gate is a positive going clock pulse. The positive portion of the signal 52 in combination with the clock pulse causes a signal to be gated to the flip-flop register 30. This will cause the flip-flop to be set thereby indicating that coding arrangement along plated wire 10, namely, a "1" at the location 14 and a "0" at location 16 gives a "one" information bit.

In like manner, if the input signal seeding the sense parametron is the signal 42 (FIG. 4a), no output signal will be produced across the coupling coils 25 and 27. This results from the face that the signal 42 seeding the sense parametron 27 is opposite in phase from the signal 52 seeding the reference parametron 23. The amplified forms of these signals will be coupled into the coupling coils 25 and 27 and will cancel each other. Since both input signals of the AND gate 29 are not present, the flip-flop 30 is not set. Consequently, the coding arrangement along plated wire 11 represents a "zero" information bit.

In summary, this invention relates to a sensing device which distinguishes a "zero" or "one" information bit by changing a phase relationship into an amplitude relationship. This is accomplished by providing a particular coding or binary datum arrangement along a plated wire. The plated wire is then energized by a sine wave having a known phase angle. The output detected across the output terminals of the sensing device, which is a pair of straps in orthogonal relationship to the plated wire will produce an output signal which is at either 0 phase or $\pi$ phase depending upon the binary datum being sensed. The phase related signals are then changed to an amplitude related signal so that a "zero" or "one" information bit is distinguished by whether a conventional flip-flop device is set or remains reset.

Obviously, many modifications and variations of the present invention are possible in the light of the above teachings. It is therefore to be understood that within the scope of the appended claims, the invention may be practiced otherwise than as specifically described.

The embodiments of the invention in which an exclusive property or privilege is claimed are defined as follows:

1. Detection apparatus comprising:
 (a) data storage means having an easy axis of magnetization,
 (b) means for storing opposite information on at least two locations of said data storage means,
 (c) a sensing means coupled to both said locations,
 (d) means for biasing said magnetization at said two locations to a quiescent position away from said easy axis by means of a first magnetizing force,
 (e) means to oscillate said magnetization about said quiescent position by means of a second magnetizing force, a single output signal being thereby induced in said sensing means by simultaneously reading-out the information stored in said two locations.

2. Apparatus comprising:
 (a) data storage means having an easy axis of magnetization,
 (b) means to store binary information by coding opposite information on at least two locations of said data storage means,
 (c) a sensing means coupled to both said locations,
 (d) means for biasing said magnetization at said two locations to a quiescent point away from said easy axis,
 (e) means to apply a magnetic field to said quiescent magnetization in a manner to oscillate said magnetization, an output signal being produced across said sensing means which is approximately twice that produced by the output of a single location.

3. The combination in accordance with claim 2 wherein said second magnetizing force comprises a bi-polar signal.

4. The combination in accordance with claim 2 wherein said sense means is coupled to said two locations differentially.

5. The combination in accordance with claim 2 wherein said sense means comprises two U-shaped conductors.

6. The combination in accordance with claim 2 wherein a detector is connected across said sense means.

7. The combination in accordance with claim 2 wherein said first and second data storage elements comprise first and second locations on a plated magnetizable wire.

8. The combination in accordance with claim 6 wherein said detector comprises a parametron device.

9. The combination in accordance with claim 8 wherein a second parametron is coupled to said first mentioned parametron wherein the output of said second parametron is combined with the output of said first parametron to produce a phased signal which determines whether a binary one or zero is stored in said two memory locations.

References Cited

UNITED STATES PATENTS

| | | | |
|---|---|---|---|
| 2,988,732 | 6/1961 | Vinal | 340—174 |
| 3,003,139 | 10/1961 | Perkins | 340—174 |
| 3,115,619 | 12/1963 | Barrett et al. | 340—174 |
| 3,229,262 | 1/1966 | Quartly | 340—174 |
| 3,229,263 | 1/1966 | Luebbe et al. | 340—174 |
| 3,283,313 | 11/1966 | Hathaway | 340—174 |
| 3,339,187 | 8/1967 | Harding et al. | 340—174 |
| 3,378,823 | 4/1968 | Kaufman et al. | 340—174 |
| 3,307,160 | 2/1967 | Young | 340—174 |

STANLEY M. VRYANOWICZ, Jr., Primary Eaminer

U.S Cl. X.R.

340—174